April 19, 1932.  M. G. MITCHELL  1,855,065
CULTIVATOR
Filed Sept. 19, 1930    2 Sheets-Sheet 1
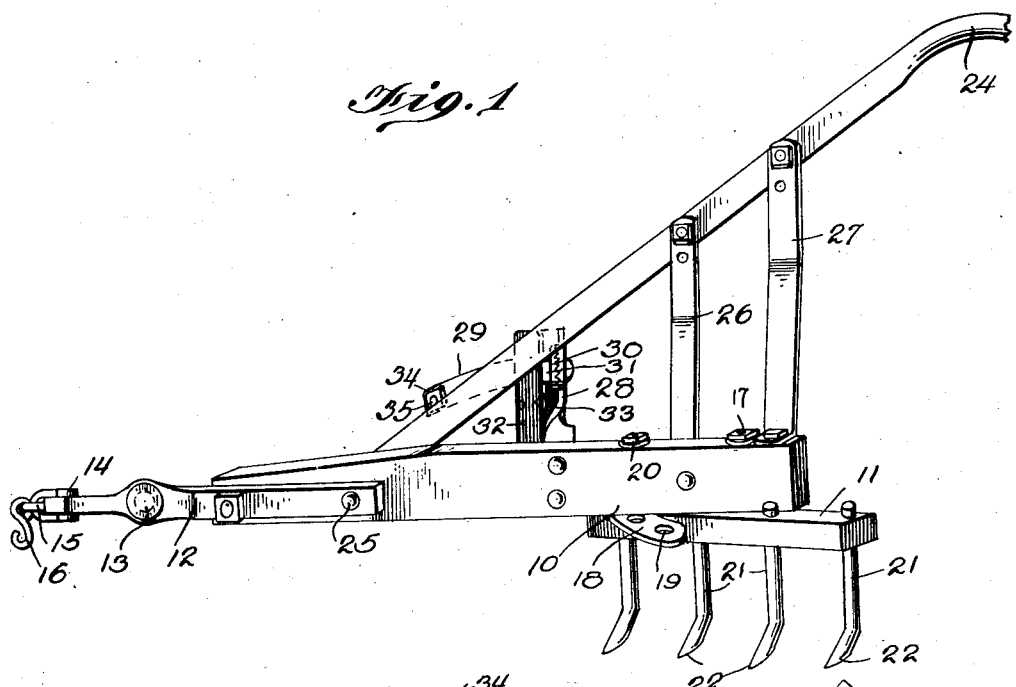
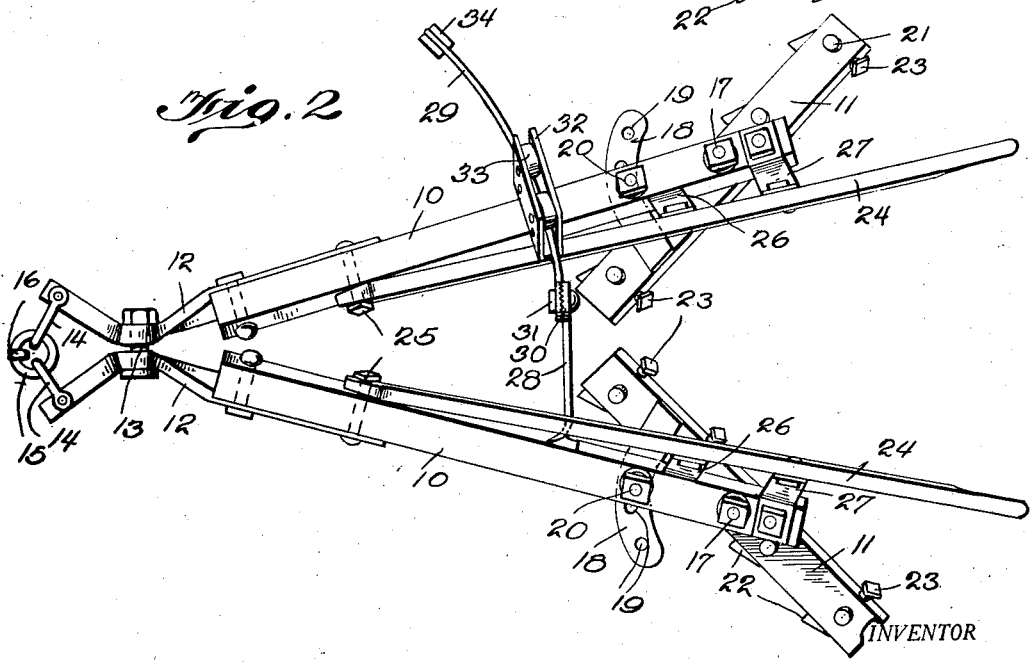
INVENTOR
M. G. Mitchell
BY
Siggers & Adams
ATTORNEYS April 19, 1932. M. G. MITCHELL 1,855,065
CULTIVATOR
Filed Sept. 19, 1930  2 Sheets-Sheet 2
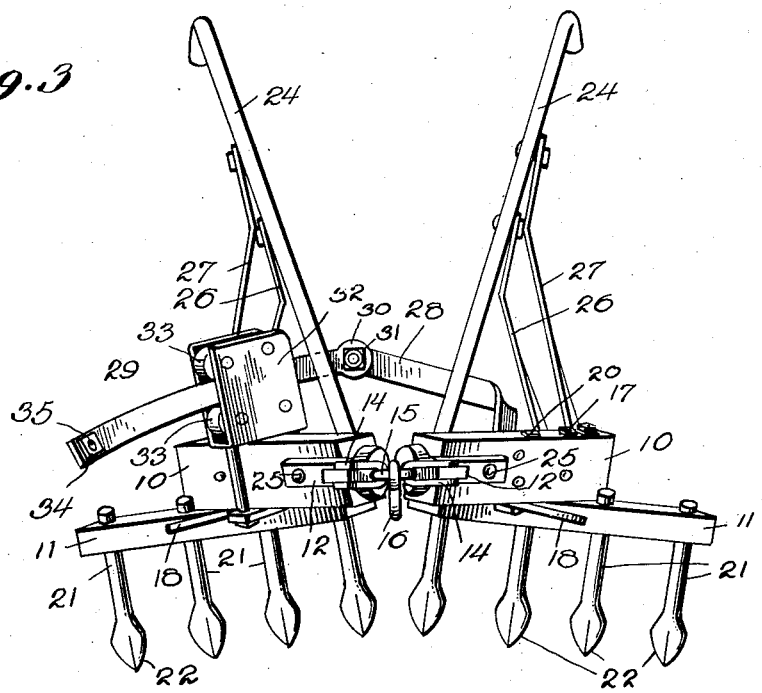
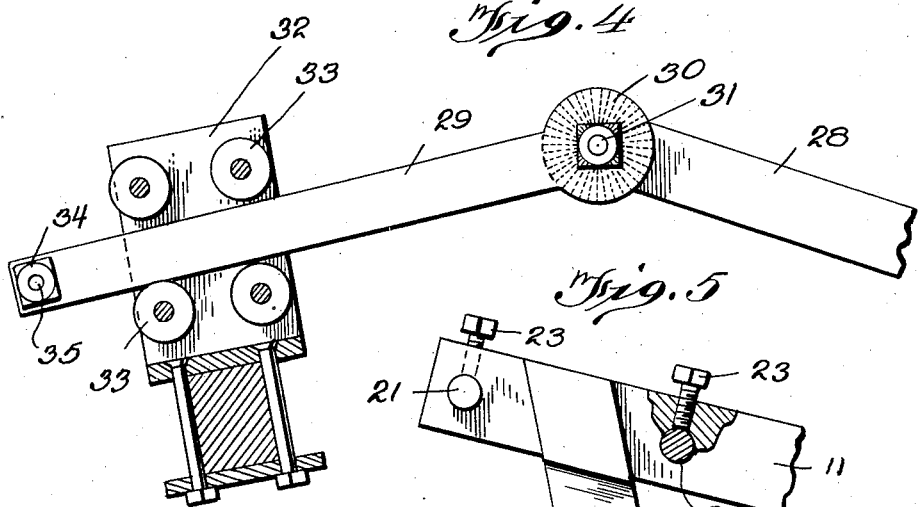
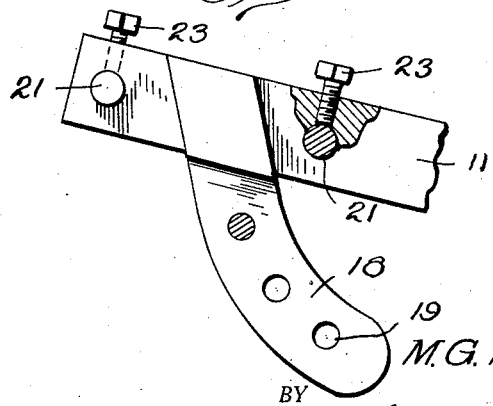
INVENTOR
M.G. Mitchell
BY
Siggers & Adams
ATTORNEYS Patented Apr. 19, 1932

1,855,065

UNITED STATES PATENT OFFICE

MARSHALL G. MITCHELL, OF LOUISVILLE, MISSISSIPPI

CULTIVATOR

Application filed September 19, 1930. Serial No. 483,106.

This invention relates to harrows or cultivators and, among other objects, aims to provide an improved, manually operated, double side harrow or cultivator having provision for various kinds of adjustments so it may be used for different kinds of cultivation on rows or beds of any height and width and means whereby the operator may easily dodge plants or obstacles by manipulating the handles.

Other aims and advantages of the invention will appear in the specification when considered in connection with the accompanying drawings, wherein:

Fig. 1 is a side elevation of a harrow embodying the invention;

Fig. 2 is a top plan view;

Fig. 3 is a front end elevation;

Fig. 4 is a fragmentary sectional view through one of the beams and showing a guide arm; and Fig. 5 is a fragmentary top plan view of one of the bars.

Referring particularly to the drawings, the harrow there shown is preferably made of two sections each having a wooden beam 10 to which tooth bars 11 are adjustably connected at their rear ends. The forward ends of the beams are shown as having bent steel draw bars 12 pivotally and loosely connected for universal movement by means of a bolt 13 so that the sections are movable or adjustable both vertically and horizontally with respect to each other. To the forward ends of the draw bars 12 are connected ordinary clevises 14 carrying a ring 15 on which is secured a hitching hook 16 (Fig. 1). The front ends of the draw bars are bent outwardly at such angles that the draft or pull on them through the clevises will tend to swing the beams away from each other and thereby equalize the inward or closing pressure caused by the harrow teeth penetrating the ground at different depths. Thus, the sections and their teeth will remain the same distance apart until the operator applies adjusting pressure to them.

In this instance, the wooden beams 10 normally lie in planes at an angle to each other, this being accomplished by twisting the draft bars 12 as indicated in Fig. 2. The tooth bars are preferably made of metal and are shown as being secured to the beams by means of bolts 17. The arrangement is such that the nut on either of these bolts may be unscrewed so that the tooth bars may be adjusted at different angles relative to the beams. An arcuate arm 18 having a series of holes 19 is conveniently secured to the upper sides of the bars and a bolt 20 also passing through each beam is adapted to engage the arms through one of the holes. Each of the bars has openings to receive round shanks 21 of harrow or cultivator teeth 22 and the shanks are adapted to be adjustably secured in place by means of set screws 23 (Fig. 5). The arrangement is such that the teeth may be very easily adjusted to throw more or less dirt and to penetrate to the desired depth in different types of beds.

To each of the beams 10 is connected an ordinary handle 24. In this example, the ends of the handles are secured to the front portions of the beams by bolts 25 which are also utilized to secure the draft bars to the beams. Further, the handles are made rigid with respect to the beams by means of suitable braces 26 and 27 on each side. These braces are conveniently made of strap metal or flat bar iron and one of them for each handle is secured to the top of the beam near the rear end to make the construction more rigid.

To enable the harrow to be adjusted manually so as to miss plants which may be out of line and to hold the sections adjusted to fit any type of bed, there is shown an adjustable guiding and supporting device so arranged that the operator can move the sections toward or from each other by working the handles. Herein, the guiding device comprises a bent metal bracket 28 secured to the inside of one of the beams and an arcuate arm 29 adjustably secured to the bracket 28 by means of toothed segments 30 and a clamping bolt 31. The arm 29 is shown as being guided in a U-shaped housing 32 between spaced pairs of rollers 33, the arrangement being such that the sections may be angularly adjusted by the guide and arm.

The curvature of the arm 29 is determined by the distance from the lock joint to the connecting bolt 13 of the draft bars, the arrangement being such that the beams may be swung inwardly or outwardly about the bolt 13 as a center and both beams will be so guided that the teeth of the harrow sections will move in substantially the same angular relation to fit the row of plants or bed. Further, the arm 29 works freely between the rollers so as to provide very easily sliding or rolling movement when the operator works the handles. The end of the arm 29 is shown as having a stop member in the form of a pair of nuts 34 threaded on a transverse bolt 35 so as to prevent the sections from being so far separated as to disengage the guide from the arm.

The angularity of the sections can be varied by adjusting the guide arm 29. It can be raised by loosening the bolt 31 and again clamping the lock joint or toothed segments together, thus bringing the teeth or plows, as the case may be, more nearly in the same plane so as to work more or less flat row beds. By adjusting the arm the other way, the outer teeth of each section will be lowered below the level of the inner or adjacent teeth so that they will cut or penetrate to the same depth on the sides of relatively high beds. Furthermore, the teeth and the tooth bars may be easily and quickly adjusted so as to throw more or less dirt toward the plants. Such adjustment is highly desirable because very small plants require little or no dirt, while larger plants need some dirt thrown around them to cover small grass in the rows.

From the foregoing description, it will be understood that the improved adjustable guide enables the harrow sections to maintain the same relative positions and provides for quick and easy adjustment by the operator to dodge plants and obstacles that may be in the beds of the sections. Furthermore, the adjustments of the tooth bars and of the teeth with respect to the bars as well as the angular adjustment made possible by the guide arm enable the implement to be used for practically any kind of cultivation. Moreover, the design is such that either section of the harrow may be separated from the other and used alone in rough ground after making a few simple and quick alterations such as adding another handle and substituting an ordinary clevis for the draw bar. The parts can be manufactured at relatively low cost and they may be assembled and adjusted by any ordinary mechanic. There are no delicate parts apt to break or get out of order in a short while and the operation is easily understood.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In combination with a cultivator composed of separate sections having a universal connection to each other at their forward ends; an adjustable guiding arm on one of the sections; and a fixed guide member on the other section cooperating with said arm to permit and maintain vertical angular adjustment of the sections and to permit the sections to be moved laterally with respect to each other to dodge plants and obstacles.

2. In combination with an implement of the class described, a pair of beams loosely and pivotally connected at their forward ends to permit universal movement and each carrying a separate cultivator section adjustably connected thereto; a handle connected to each beam; a bracket arm secured to one of the beams and projecting above the other beam; a guiding member secured to said other beam and cooperating with said arm to permit lateral adjustment of the beams; and adjustable means whereby said arm and guiding member maintain the cultivator sections in substantially the same vertical angular relation with respect to each other when they are adjusted laterally by the handles.

3. An implement of the character described, comprising, in combination, a pair of wooden beams having draft bars pivotally and loosely connected to each other; tooth bars adjustably secured to the rear ends of said beams; handles rigidly connected to the beams; a bracket on one of the beams; a guiding arm adjustably secured to said bracket and projecting over the other beam; and a fixed guiding member for said arm secured to said other beam and having spaced pairs of anti-friction rollers cooperating with said guiding arm whereby to maintain the same vertical angular relation between the harrow sections for all positions of lateral adjustment thereof.

4. In a cultivator of the class described, a pair of beams; harrow sections carried by the beams; draw bars on the beams loosely connected to each other at their forward ends to permit the harrow sections to be separated laterally to dodge obstacles; adjustable means to maintain the same vertical angular relation between the harrow sections when they are separated laterally; said draw bars having outwardly bent forward ends; clevises on the forward ends; and hitching means connected to both clevises so arranged that the draft or pull tends to separate the harrow sections and equalizes the closing pressure exerted on the rear ends of the sections due to penetration of the harrow teeth.

In testimony, that I claim the foregoing as my own, I have hereto affixed my signature.

MARSHALL G. MITCHELL.